(12) United States Patent
Thetford

(10) Patent No.: US 8,664,350 B2
(45) Date of Patent: Mar. 4, 2014

(54) POLYMERIC COUPLING AGENTS

(75) Inventor: Dean Thetford, Norden (GB)

(73) Assignee: Lubrizol Limited, Derby (GB)

( * ) Notice: Subject to any disclaimer, the term of this patent is extended or adjusted under 35 U.S.C. 154(b) by 796 days.

(21) Appl. No.: 12/445,489

(22) PCT Filed: Oct. 23, 2007

(86) PCT No.: PCT/EP2007/061349
§ 371 (c)(1),
(2), (4) Date: Apr. 14, 2009

(87) PCT Pub. No.: WO2008/049840
PCT Pub. Date: May 2, 2008

(65) Prior Publication Data
US 2009/0306252 A1    Dec. 10, 2009

Related U.S. Application Data

(60) Provisional application No. 60/862,645, filed on Oct. 24, 2006, provisional application No. 60/863,024, filed on Oct. 26, 2006.

(51) Int. Cl.
*C08G 73/10*    (2006.01)
*C08G 63/00*    (2006.01)
*C08L 97/02*    (2006.01)

(52) U.S. Cl.
USPC .................. 528/271; 528/310; 524/1; 524/13

(58) Field of Classification Search
USPC .................................. 528/271, 310; 524/1, 13
See application file for complete search history.

(56) References Cited

U.S. PATENT DOCUMENTS

| | | | | |
|---|---|---|---|---|
| 4,533,723 A | * | 8/1985 | Weitemeyer | 528/303 |
| 4,722,947 A | * | 2/1988 | Thanawalla et al. | 522/120 |
| 5,665,828 A | | 9/1997 | Lee | |
| 5,786,415 A | | 7/1998 | Blanchard et al. | |
| 2005/0165144 A1 | | 7/2005 | Rothon et al. | |

OTHER PUBLICATIONS

Prof. Dr. Marino Xanthos (Ed.); Rothon, Roger N., Functional Fillers for Plastics, "Functional Polymers and Other Modifiers", pp. 105-128, Sep. 26, 2005, Wiley-Vch Verlag GmbH & Co. KGaA, ISBN 3-527-31054-1, DE, XP-002468254.

Schofield, John D. et al.; "A Novel Coupling Agent Technology", Polymer & Polymer Composites, vol. 11, No. 2, 2003, pp. 71-79., XP-009095774.

Schofield, John D.; "New Coupling Agents Enhance Mechanical Properties in Filled Polymers", Plastics Additives and Compounding, Elsevier Science, Oxford, GB, vol. 7, No. 2, Mar. 2005, pp. 38-42, XP-004848358.

\* cited by examiner

*Primary Examiner* — Satya Sastri
(74) *Attorney, Agent, or Firm* — Samuel B. Laferty

(57) ABSTRACT

The invention relates to a composition containing a particulate solid, a plastic material and a compound. The invention further relates to novel compounds, and the use of the coupling agents.

16 Claims, No Drawings

POLYMERIC COUPLING AGENTS

CROSS REFERENCE TO RELATED APPLICATION

This application claims priority from PCT Application Serial No. PCT/EP2007/061349 filed on Oct. 23, 2007, which claims the benefit of U.S. Provisional Application No. 60/862,645 filed on Oct. 24, 2006 and on U.S. Provisional Application No. 60/863,024 filed on Oct. 26, 2006.

FIELD OF INVENTION

The invention relates to a composition containing a particulate solid, a plastic material and a compound. The invention further relates to novel compounds, and the use of the coupling agents.

BACKGROUND OF THE INVENTION

Coupling agents are known in polymer materials and are useful for creating interactions between the polymer material and a surface of a particulate solid (typically an inorganic filler particle). Common coupling agents include organosilanes, or dispersants containing a carboxylic acid. The coupling agent is believed to form interactions with the particulate solid by bonds forming between the coupling agent and the particulate solid.

A coupling agent containing a carboxylic acid are described in articles including A. Tabtiang et al., Composite Interfaces, 6, 65 (1999); C. M. Liauw et al., Plastics, Rubber and Composites Processing and Applications, 24, 211, (1995); and C. M. Liauw et al., J. Adhesion Sci. and Tech., 15, 889, (2001). All three references disclose maleic anhydride copolymers that open the anhydride ring and the carboxylic acid groups then bond directly with the particulate solid. The coupling agent containing a carboxylic acid typically is required to be utilised in large amounts. Large amounts of the coupling agent, typically lead to detrimental performance including modified degradation of the plastic material and/or side reactions resulting in compatibility problems between the plastic material and the coupling agent.

U.S. Pat. No. 4,722,947 discloses film-forming radiation-curable low molecular weight partial ester copolymer compositions of a terminally ethylenically unsaturated compound and maleic anhydride characterised by having free-anhydride functionality. The copolymer is produced by esterifying a hydroxyalkyl acrylyl compound with a monohydric alcohol.

U.S. Pat. No. 4,533,723 discloses semi-esters of polyisobutylene succinic acid. The semi-esters are prepared from hydroxyalkyl(meth)acrylates.

U.S. Pat. No. 5,665,828 discloses a polybutylene polymer or oligomer which contains in its molecule at least one acryl group, the polybutylene polymer is prepared by reacting an anhydride-functional polybutylene polymer or derivative thereof with an acryl-functional compound having at least one hydroxyl-containing group, chlorine, isocyanate group, epoxy group or an amine group.

International Application WO 04/092227 discloses polyisobutenyl(meth)acrylates useful in photocurable lacquers and adhesives.

Organosilane coupling agents are typically formed by complex processes and many additionally are less effective in interacting with a wide range of particulate solids.

Hence, there is a need for a coupling agent capable of overcoming problems associated with the art.

SUMMARY OF THE INVENTION

In one embodiment, the invention provides a composition comprising a particulate solid, a plastic material and a compound represented by Formulae (1a) and/or (1b); and salts thereof:

$$R^1-(Y)_p \quad \text{Formula (1a)}$$

or $$R^2-[(R^1)_u(Y)_v]_t-R^2 \quad \text{Formula (1b)}$$

wherein
  $R^1$ is a lipophilic group containing 6 or more carbon atoms;
  $R^2$ is a polymerisation terminating group;
  p varies from 1 to 500;
  t is the number of repeat units, in the range including 2 to 10,000, or 5 to 5000, or 10 to 2500, or 15 to 1000;
  u varies from 1 to 500, or 1 to 250;
  v varies from 1 to 500, or 1 to 250;
  Y comprises 1% to 100% of Y groups represented by Formula (2), and 0% to 99% of Y groups represented by at least one group of the Formulae selected from (3) to (7):

$$\text{Formula (2)}$$

structure with OH and Z substituents $$\text{Formula (3)}$$

structure with OH and $NR^6R^7$ substituents $$\text{Formula (4)}$$

structure with N–$R^8$ $$\text{Formula (5)}$$

structure with OH and $R^9O$ substituents $$\text{(Formula (6))}$$

structure with OH and HO substituents $$\text{Formula (7)}$$

anhydride-type structure

Z is $-[OACO]_m-[OCHR^3CR^4H]_n-R^5$, or $-[OACO]_m-[O-(CH_2)_4]_n-R^5$;
A is $C_{1-20}$ alkylene, $C_{2-20}$ alkenylene group, or mixtures thereof;
e is 1 or 2;
m varies from 0 to 50;
n varies from 1 to 50;

$R^3$ and $R^4$ are independently H or $C_1$-$C_2$ alkyl (such as methyl, ethyl, or mixtures thereof), with the proviso that at least one of $R^3$ and $R^4$ is H;

$R^5$ is an ethylenically unsaturated group; and $R^6$, $R^7$, $R^8$ and $R^9$ are independently hydrocarbyl groups.

The compound of Formula (1b) typically includes a random copolymer, or an alternating copolymer or an interpolymer represented by a repeat unit of $[(R^1)_u\text{—}(Y)_v]_t$.

The structure

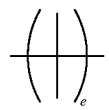

in the structures of Formulas (2) through (7) is meant to assert that one bond is present at the adjacent methylene group or groups (depending on whether e is 1 or 2). It does not represent an additional carbon atom(s) or methylene groups are present. When e is 1 only one of the adjacent methylene groups (either the one on the left or right of the structure) has a bond, when e is 2 both adjacent methylene groups to the structure have a bond. In this way the structure is used similarly to how it is used when a straight line is drawn dissecting a benzene or naphthalene ring, such as

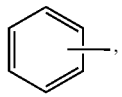

to indicate a substituent can be attached to any carbon atom of the benzene ring in lieu of a hydrogen atom. Thus, Formula 2 is represented by any of Formulas 2a, 2b, and 2c shown below. Similar derivatives of Formulas 3-7 can be drawn. Formulas 4, 6 and 7 are symmetrical (left to right) and thus Formula 4a would be identical to 4b and the same for 6a and 6b and for 7a and 7b.

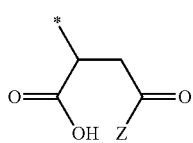
Formula (2a)

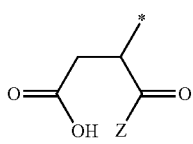
Formula (2b)

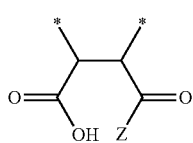
Formula (2c)

Where the * indicates where a bond to the methylene carbon occurs.

Typically, for a compound represented by Formula (1b), e is 1 when the Y group represented by Formulae (2) to (7) is bonded directly to $R^2$. Typically, e is 2 for a compound represented by Formula (1b), when the Y group represented by Formulae (2) to (7) is bonded to a group other than $R^2$.

In one embodiment, the invention provides a compound represented by Formulae (1a) and/or (1b) as defined above; and salts thereof.

In one embodiment, the compound disclosed herein by the Formula (1b) has a weight average molecular weight of the lipophilic group in ranges including greater than 20,000 to 1,000,000, or 22,500 to 500,000, or 25,000 to 300,000.

In one embodiment, the compound disclosed herein by the Formula (1a) has a lipophilic group $R^1$ containing 6 to 30, or 6 to 28 carbon atoms.

In one embodiment, the compound disclosed herein by the Formulae (1a) and/or (1b) has a lipophilic group $R^1$ that is selected from the group consisting of polyethylene, polypropylene, polybutadiene, ethylene vinyl acetate, ethylene-propylene copolymers, ethylene-butadiene copolymers, propylene-butadiene copolymers, and mixtures thereof.

In one embodiment, the invention provides a composition comprising a particulate solid, a plastic material and a compound formed from a reaction product of a hydroxy-alkyl (meth)acrylate and a mono- or di-substituted anhydride-containing moiety, to form a coupling agent.

In one embodiment, the invention provides a composition comprising a particulate solid, a plastic material and a compound formed from a reaction product of (a) a hydroxy-alkyl (meth)acrylate, (b) mono- or di- or poly-substituted anhydride-containing moiety, and optionally at least one compound selected from the group consisting of (i) water, (ii) an alcohol and (iii) an amine, to form a coupling agent.

In one embodiment, the invention provides a compound represented by Formulae (1a) or (1b); and salts thereof, as a coupling agent. In one embodiment, the coupling agent is suitable for a plastic material.

In one embodiment, the invention provides a composition comprising (a) Formulae (1a) and/or (1b), and salts thereof; and (b) at least one compound selected from the group consisting of maleinised polymers other than Formula (1a) and/or Formula (1b), silanes, titanates, and zirconates.

In one embodiment, the invention provides a composition comprising a particulate solid, a plastic material, a compound represented by Formulae (1a) and/or (1b), and salts thereof; and at least one compound selected from the group consisting of maleinised polymers other than Formula (1a) and/or Formula (1b), silanes, titanates, and zirconates.

DETAILED DESCRIPTION OF THE INVENTION

The present invention provides a composition as disclosed herein above.

As used herein, the term "(meth)acryl" includes acrylic and methacrylic e.g., (meth)acrylates include acrylates and methacrylates.

As described hereinafter, the molecular weight of the coupling agent may be determined using known methods, such as GPC analysis using polystyrene standards.

In Formula (1a), p includes integers of 1 or 2 to 500. In one embodiment, p of Formula (1a) is equal to 1. In one embodiment, p of Formula (1a) is 2 to 500.

In Formula (1a), when p=1 or p=2, the percentage of Y groups represented by Formula (2) includes 25% to 100%, or 50% to 100% or 75% to 100%.

In one embodiment, the percentage of Y groups represented by Formula (2) includes 20% to 100%; and the percentage of Y groups represented by at least one Formulae selected from (3) to (7) includes 0% to 20%.

In one embodiment, Y may be derived from succinic acid group or an succinic anhydride group thereof.

The compound of Formulae (1a) or (1b) Y may also be referred to as a semi-ester and/or semi-acid-ester compound.

When p=1, the weight average molecular weight of the compound of Formula (1a) includes ranges of 200 to 10,000, or 300 to 7500, or 300 to 5000.

When p is 2 to 500, the weight average molecular weight of the compound of Formula (1a) includes ranges of 500 to 1,000,000, or 1000 to 500,000, or 1500 to 300,000.

When p=1, the lipophilic group $R^1$, typically contains at least 6, or at least 10 carbon atoms. The upper limit on the number of carbon atoms for $R^1$ includes 300, 400 or 500.

In one embodiment, the compound of Formula (1a) containing an $R^1$ group includes a $C_{6-500}$, or $C_{10-400}$, or $C_{10-300}$ alk(en)yl group.

The $C_{40-500}$ alk(en)yl group typically includes a polyisobutenyl group. The polyisobutenyl group may have a number average molecular weight of 350, 450 or 550 to 5000, or 750 to 3000, or 900 to 2500. In different embodiments, the polyisobutenyl group number average molecular weight includes ranges of 350-750, or 950-1000, or 2200-2300.

When p=1, typically the Y—$R^1$ group of Formula (1a) may be derived from an alk(en)yl-substituted succinic acid, anhydride, or partial esters thereof. Examples of suitable succinic anhydrides include dodecyl succinic anhydride, hexadecyl succinic anhydride, octadecyl succinic anhydride, eicosyl succinic anhydride, $C_{24-28}$-alkyl succinic anhydride, dodecenyl succinic anhydride, hexadecenyl succinic anhydride, octadecenyl succinic anhydride, eicosenyl succinic anhydride, $C_{24-28}$-alkenyl succinic anhydride, or polyisobutylene succinic anhydride, or mixtures thereof.

When p=2 to 500, typically the lipophilic group $R^1$ is a polymer backbone that is grafted with a Y group. Examples of a suitable polymer backbone include a polyolefin (such as polypropylene, polybutadiene, polyisoprene, polyethylene, or ethylene-propylene copolymers), ethylene vinyl acetate, poly(styrene-butadiene), ethylene vinyl acetate, ethylene-butadiene copolymers, propylene-butadiene copolymers.

The polymerisation terminating group ($R^2$) includes hydrogen, hydroxyl, linear or branched alkyl, aryl, alkoxy, amino, mono- or di-alkylamino, or mixtures thereof. In Formula (1b), the polymerisation terminating group may be the same or different.

The hydroxy carboxylic acid from which A (or the —OACO— group of Z) may be derived includes a hydroxy-$C_{2-20}$-alkenylene carboxylic acid or a hydroxy-$C_{1-20}$ alkylene carboxylic acid. Specific examples of suitable hydroxy carboxylic acids include ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid, glycolic acid, or mixtures thereof.

A (or the —OACO— group of Z) may also be derivable from a lactone, such as β-propiolactone, optionally $C_{1-6}$-alkyl substituted ε-caprolactone, or optionally $C_{1-6}$-alkyl substituted δ-valerolactone. Specific examples include e-caprolactone and the 7-methyl-, 3-methyl-, 5-methyl-, 6-methyl-, 4-methyl-, 5-tetra-butyl-, 4,4,6-trimethyl- and 4,6,6-trimethyl-ε-caprolactones, δ-valerolactones, or mixtures thereof.

In one embodiment, $R^3$ and $R^4$ are both hydrogen. Typically, $R^3$ and $R^4$ are both hydrogen when ethoxylate chemistry is utilised.

In one embodiment, either $R^3$ or $R^4$ is $C_1$, when n is equal to 1 or 2. $R^3$ or $R^4$ is $C_1$, where propoxylate chemistry is utilised.

In one embodiment, $R^3$ is $C_1$-$C_2$ and $R^4$ is H, when n is equal to an integer from 3 to 50. Typically, $R^3$ is $C_1$-$C_2$ and $R^4$ is H, where polypropylene glycol or polybutylene glycol is utilised.

In one embodiment, $R^5$ is derivable from an acrylic acid, a methacrylic acid, or mixtures thereof.

In one embodiment, Z is derivable from a hydroxy-alkyl (meth)acrylate. Examples of a suitable hydroxy-alkyl(meth) acrylate (or a Z group is derivable from) include 4-hydroxy-butylacrylate, 2-hydroxyethylacrylate, 2-hydroxypropylacrylate, 2-hydroxybutylacrylate, 2-hydroxypentylacrylate, 2-hydroxyhexylacrylate, 2-hydroxy-2-methylpropylacrylate, polyethylene glycol acrylate, polypropylene glycol acrylate, 2-hydroxyethyl methacrylate, 2-hydroxypropyl methacrylate, 2-hydroxybutyl methacrylate, 2-hydroxypentyl methacrylate, 2-hydroxyhexyl methacrylate, 2-hydroxy-2-methylpropyl methacrylate, or mixtures thereof. In one embodiment, the hydroxy-alkyl (meth) acrylate includes 2-hydroxyethylacrylate, polyethylene glycol methacrylate, polypropylene glycol methacrylate, or mixtures thereof.

In one embodiment, $R^6$, $R^7$ and $R^8$ are derivable from an amine. In different embodiments, $R^6$, $R^7$ and $R^8$ independently contain 1 to 40, or 1 to 30, or 1 to 24, or 1 to 20 carbon atoms.

Examples of suitable amines include methyl amine, dimethylamine, ethyl amine, diethylamine, butyl amine, di-butyl amine, hexyl amine, di-hexyl amine, 2-ethylhexyl amine, di-(2-ethylhexyl)amine, nonyl amine, di-nonyl amine, dodecyl amine, di-dodecyl amine, pentadecyl amine, di-pentadecyl amine, octadecyl amine, di-octadecyl amine, 3-(dimethylamino)-n-propylamine, di(3-(dimethylamino)-n-propyl] amine, morpholine, or mixtures thereof.

In one embodiment, $R^9$ is derivable from an alcohol. In different embodiments, $R^9$ contains 1 to 40, or 1 to 30, or 1 to 24, or 1 to 20 carbon atoms.

Examples of suitable alcohols include methanol, ethanol, propanol, butanol, pentanol, hexanol, heptanol, octanol, 2-octanol, 2-butoxyethanol, decanol, dodecanol, tetradecanol, hexadecanol, octadecanol, eicosanol, isopropanol, isobutanol, tert-butanol, 2-ethylbutanol, 2-ethylhexanol, 3-heptanol, 3,5,5-trimethylhexanol, 3,7-dimethyloctanol and the so-called Guerbet alcohols such as those which are commercially available under the trade name Isofol (ex Condea GmbH), or mixtures thereof. Specific examples of Guerbet alcohols are Isofol 12, 14T, 16, 18T, 18E, 20, 24, 28, 32, 32T and 36.

The compound of Formula (1b) typically includes a random copolymer, or an alternating copolymer or an interpolymer represented by a repeat unit of $[(R^1)_u—(Y)_v]_t$. In one embodiment, the compound of Formula (1b) is derived from a copolymer or an interpolymer of an α-olefin copolymerised with an unsaturated carboxylic acid (typically maleic anhydride).

The α-olefin includes 1-hexene, 1-heptene, 1-octene, 2-methyl-1-heptene, 1-nonene, 1-decene, 1-dodecene, 1-tetradecene, 1-hexadecene, 1-octadecene, 1-eicosene, 1-terra eicosene, 1-hexa eicosene, 1-octa eicosene, or mixtures thereof.

Examples of an alternating copolymer or an interpolymer include vinyl acetate-maleic anhydride copolymers, methyl vinyl ether-maleic anhydride copolymers, ethylene ethyl acrylate-maleic anhydride copolymers, ethylene butyl acrylate-maleic anhydride copolymers, styrene-maleic anhydride copolymers, isobutylene-maleic anhydride copolymers, isoprene-maleic anhydride copolymers, octadecene-maleic anhydride copolymers, dodecene-maleic anhydride copolymers, $C_{24-28}$ alkylene-maleic anhydride copolymers, or mixtures thereof. A more detailed description on methods of preparing alternating copolymer or an interpolymer is described in U.S. Pat. No. 4,526,950.

In different embodiments, the weight average molecular weight of the alternating copolymer or an interpolymer includes 1000 to 1,000,000, or 1000 to 1,000,000, or 1000 to 500,000, or 1000 to 300,000.

Typically, the reaction product of (a) a hydroxy-alkyl (meth)acrylate and a mono- or di-substituted anhydride-containing moiety, to form a coupling agent; or (b) a reaction product of a hydroxy-alkyl(meth)acrylate, a mono- or di-substituted anhydride-containing moiety, and optionally (c) at least one compound selected from the group consisting of (i) water, (ii) an alcohol and (iii) an amine, to form a coupling agent is prepared at an elevated temperature including 50° C. to 175° C., or 60° C. to 150° C.; and for a period of time including 1 to 24 hours, or 2 to 10 hours.

The reaction product (a) a hydroxy-alkyl(meth)acrylate and a mono- or di-substituted anhydride-containing moiety, to form a coupling agent; or (b) a reaction product of a hydroxy-alkyl(meth)acrylate, a mono- or di-substituted anhydride-containing moiety and an amine, is a coupling agent with a structure similar to Formulae (1a) and/or (1b), where the Y group includes a mixture of Formula (2) with at least one of Formula (3) and (4).

The reaction product (a) a hydroxy-alkyl(meth)acrylate and a mono- or di-substituted anhydride-containing moiety, to form a coupling agent; or (b) a reaction product of a hydroxy-alkyl(meth)acrylate, a mono- or di-substituted anhydride-containing moiety and an alcohol, is a coupling agent with a structure similar to Formulae (1a) and/or (1b), where the Y group includes a mixture of Formula (2) and Formula (5).

The reaction product (a) a hydroxy-alkyl(meth)acrylate and a mono- or di-substituted anhydride-containing moiety, to form a coupling agent; or (b) a reaction product of a hydroxy-alkyl(meth)acrylate, a mono- or di-substituted anhydride-containing moiety and water, is a coupling agent with a structure similar to Formulae (1a) and/or (1b), where the Y group includes a mixture of Formula (2) and Formula (6).

The reaction product (a) a hydroxy-alkyl(meth)acrylate and a mono- or di-substituted anhydride-containing moiety, to form a coupling agent; or (b) a reaction product of a hydroxy-alkyl(meth)acrylate, a mono- or di-substituted anhydride-containing moiety and optionally at least one compound selected from the group consisting of (i) water, (ii) an alcohol, and (iii) an amine, is a coupling agent with a structure similar to Formulae (1a) and/or (1b) with a Y group similar to Formula 7 when a mono- or di-substituted anhydride-containing moiety remains unreacted.

In one embodiment, the reaction product (a) a hydroxy-alkyl (meth)acrylate and a mono- or di-substituted anhydride-containing moiety, to form a coupling agent; or (b) a reaction product of a hydroxy-alkyl(meth)acrylate, a mono- or di-substituted anhydride-containing moiety and optionally at least one compound selected from the group consisting of (i) water, (ii) an alcohol, and (iii) an amine, forms a product with a Y group similar to Formula (2) and at least two of Formulae (3) to (7).

The reaction product may be prepared in an inert or air atmosphere. If an inert atmosphere is used, a polymerisation inhibitor is present during the reaction. If the reaction product is prepared in an air atmosphere, the polymerisation inhibitor may still be present.

A mono-substituted anhydride-containing moiety is typical of a compound represented by Formula (1a).

A di-substituted anhydride-containing moiety is typical of group found in an alternating copolymer, a random copolymer, or an interpolymer as defined above.

In one embodiment, the coupling agent of the present invention is in a mixture with maleinised polymers other than Formula (1a) and/or Formula (1b), silanes, titanates, zirconates, or mixtures thereof.

Examples of a suitable silane include vinyltrimethoxy silane, vinyltriethoxy silane, vinyltris(2-methoxyethoxy silane), vinyltriacetoxy silane, N-(2-aminoethyl)(3-aminopropyl)trimethoxy silane, 3-aminopropyltrimethoxy silane, 3-aminopropyltriethoxy silane, (3-acryloxy-2-hydroxypropyl)triethoxy silane, N-(2-aminoethyl)(3-aminopropyl)methyldimethoxy silane, (methacryloxymethyl)triethoxy silane, (3-acryloxypropyl)trimethoxy silane, (3-methacryloxypropyl)trimethoxy silane, (methacryloxymethyl)trimethoxy silane, (methacryloxymethyl)methyldimethoxy silane, (methacryloxymethyl)methyldiethoxy silane, (3-isocyanatopropyl)trimethoxy silane, (3-isocyanatopropyl)triethoxy silane, (3-glycidoxypropyl)trimethoxy silane, (3-glycidoxypropyl)triethoxy silane, 3-(triethoxysilyl)propylsuccinic anhydride, (isocyanatomethyl)methyldimethoxy silane, (isocyanatomethyl)trimethoxy silane, (N-cyclohexylaminomethyl)triethoxy silane, 3-aminophenyltrimethoxy silane, 4-aminophenyltrimethoxy silane, (N-phenylaminomethyl)trimethoxy silane, N-(2-aminoethyl)-3-aminopropylmethyldimethoxy silane, (3-mercaptopropyl)triethoxy silane and Bis(3-(triethoxysilyl)propyl)tetrasulphide.

In one embodiment, the maleinised polymers are selected from the group consisting of polyethylene, polypropylene, polybutadiene, ethylene vinyl acetate, ethylene-propylene copolymers, ethylene-butadiene copolymers, propylene-butadiene copolymers, and mixtures thereof.

Examples of suitable titanates, and zirconates are described in a Journal article entitled "Neoalkoxy Titanate and Zirconate Coupling Agent Additives in Thermoplastics", by S. J. Monte, and published in "Polymers and Polymer Composites", 2002, Volume 10, Issue 1, Pages 1-52.

In one embodiment, the coupling agent is dispersed within the composition. In one embodiment, the coupling agent is uniformly dispersed within the composition.

The inorganic particulate solid may be any solid material which is used with polymeric materials and specifically includes such solids used as fillers. The solids may be in the form of a granular material or in the form of a powder, often a blown powder. Examples include calcium carbonate, calcium sulphate, calcium oxide, barium sulphate, barium carbonate, magnesium oxide, magnesium hydroxide, titanium dioxide, iron oxide, calcium and magnesium silicates, alumino silicates, kaolin, mica, talc, chalk, metal fibres and powders, zinc, aluminium, aluminium trihydroxide, glass fibres, refractory fibres, carbon black including reinforcing and non-reinforcing carbon black, alumina, quartz, wood flour, powdered paper/fibre, asbestos, crysatille, anthophylite, crocidolite, wollastonite, attapulgite and the like, particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g., barium ferrites; and metal particles, for instance metallic iron, nickel, cobalt, copper and alloys thereof.

The coupling agent may be coated on the surface of the particulate solid at any convenient stage in the preparation of the composite. Thus, the particulate solid may be pre-coated with the coupling agent or the coupling agent may be added to a mixture of particulate solid and polymeric material during preparation of the composite.

When the particulate solid is pre-coated with the coupling agent, it may be prepared by mixing the two components together under anhydrous conditions. This mixing may be accompanied by an attrition process to reduce the particle size of the particulate solid. Alternatively, the coupling agent may be applied to the particulate solid in a liquid carrier which may be a polar or non-polar organic solvent or an aqueous emulsion. Contact between the particulate solid and carrier containing the coupling agent may involve any method known to the art such as dipping or spraying. The coated particulate solid may then be separated from the organic solvent by any suitable means such as filtration and any excess coupling agent may be removed, where desired, by washing with an appropriate organic solvent. As a further variant, the coated particulate solid may be obtained by evaporation of the organic solvent. Examples of suitable solvents are methanol, ethanol, propanol, diethylether, acetone, methyl ethyl ketone, ethyl acetate, benzene, toluene, xylene, hexane, heptane, decalin, tetralin, methylene chloride and chloroform.

The mixing of the particulate solid and coupling agent is generally carried out at from 20° C. up to the decomposition temperature of the coupling agent. It may be carried out at normal atmospheric pressure but higher or lower pressure is also possible if this aids the distribution of the coupling agent on the surface of the particulate solid.

When the particulate solid and coupling agent are mixed under anhydrous conditions, the surface coating of the particulate solid is typically carried out in the presence of air or oxygen since this reduces the possibility of the coupling agent undergoing polymerisation.

When the particulate solid is coated with the coupling agent in a carrier, it is typical to include a polymerisation inhibitor such as hydroquinone, methyl hydroquinone, p-benzoquinone, naphthoquinone or tert-butylcatechol or hindered phenols such as 2,6-di-tert butyl phenol. Hindered phenols are available under the trademark Irganox® (Ciba Specialty Chemicals).

The amount of polymerisation inhibitor includes not greater than 10%, or not greater than 5%, or not greater than 0.2% based on the weight of the coupling agent. Typically, the amount of polymerisation inhibitor is not less than 0.05%, or not less than 0.1% based on the weight of the coupling agent.

The amount of coupling agent coated on the surface of the particulate solid is largely dependent on the nature of the solid and its surface area. Typically, amounts of coupling agents are sufficient to provide for at least a mono-molecular layer of the coupling agent on the particulate solid. In different embodiments, the amount of coupling agent is not greater than 20%, or not greater than 6%, or not greater than 2% based on the weight of particulate solid. It is also typical that the amount of coupling agent is not less than 0.01%, or not less than 0.2%, or not less than 0.3% based on the amount of particulate solid.

The particulate solid coated with coupling agent has been found to be particularly effective when used with thermoplastic polymeric materials, for example, polyolefins such as high density polyethylene, medium and low density polyethylenes, crystalline polypropylene, crystalline ethylene-propylene block copolymers, polybutene, and poly-4-methyl pent-1-ene; polyvinyl chloride, polyvinylidene chloride, polystyrene, poly methyl(meth)acrylates; polyamides; polyacetals, linear polyesters, polyurethanes, ABS polymers including mixtures thereof and their blends with elastomers.

In the case of thermoplastic polymers, it is common to melt-mix the polymer, particulate solid and coupling agent in the presence of a free radical generator such as dicumyl peroxide, 2,5-dimethyl-2,5-di(tert-butyl peroxy)hexane, azobisisobutyronitrile, dibutyltinoxide and di(tert-butyl peroxy isopropyl)benzene. Where the polymeric material already contains a free-radical generator, it may not be necessary to add further amounts of the free-radical generator. It is thought that the free radical generator causes the ethylenic bond of the coupling agent to polymerise with itself and/or the polymeric material.

Alternatively, the free-radical generator may also be already present in the polymeric material.

The amount of free radical generator may vary. In different embodiments, the amount of free radical is present in amounts from 1 to 100%, or not greater than 70%, or not greater than 50% based on the weight of coupling agent.

When the polymeric material containing the particulate solid and coupling agent is applied as a coating to a solid surface, the polymerization may be initiated by other suitable means such as electron beam or actinic radiation where the composite also contains an appropriate photo initiator.

The amount of particulate solid in the composite comprising the plastics material, particulate solid and coupling agent can vary over a wide range and depends on the nature of the particulate solid and the intended use of the composite. Typically, the amount of particulate solid is present in ranges including 20 to 80% or 20 to 60% based on the amount of the composite.

Whereas, it is generally common to coat the particulate solid with the coupling agent, it is sometimes more convenient to pre-prepare a mixture of coupling agent and polymeric material and use such a mixture to coat the particulate solid. This is particularly the case where the amount of coupling agent is a relatively small component of the final composite.

Thus, as a further aspect of the invention, there is provided a composition comprising a coupling agent and a polymeric material. In one embodiment, the amount of coupling agent is 1 to 30% by weight based on the amount of polymeric material. The mixing may be carried out in any suitable apparatus which is appropriate to the physical state of the coupling agent and polymeric material. The blended mixture of coupling material and polymeric material may contain a polymerisation inhibitor or a polymerisation catalyst depending on whether it is desirable to add the blended mixture to the particulate solid either before or after polymerisation of the coupling agent.

The composition comprising the coupling agent and the polymeric material may be formulated with the particulate solid in a similar manner to that described hereinbefore for the coupling agent and the particulate solid. This composition may then be treated as a "master batch" and added to additional polymeric material when forming fabricated articles. The amount of "master batch" which is mixed with the additional polymeric material may vary over wide limits depending on the nature of polymeric material and the particulate solid. In different embodiments, the amount of "master batch" ranges include 0.5 to 50%, or 10 to 50%, or 20 to 50% based on the total weight of the final composite. Although the polymeric material used in preparing the "master batch" may differ from the addition of polymeric material, but it is typically the same. The use of "master batches" is especially useful where the polymeric material includes polypropylene, polyethylene, polyethylene/polypropylene diene, ethyl vinyl acetate, polychloroprene, chlorinated polyethylene, chlorosulphonated polyethylene, poly vinyl chloride, natural and synthetic rubber such as butadiene-based elastomers (for instance butadiene-styrene, butadiene-acrylonitrile rubbers, polybutadiene), polyisoprene or natural rubber.

The composite may contain other adjuncts which are commonly added to composites such as stabilisers, UV absorbers, plasticisers, lubricants, cross-linking agents, cross-linking accelerators, pigments, fire retardants, anti-statics, thickening agents, blowing agents and mold release agents.

When the coupling agent is a liquid, it is advantageous to absorb the modifier onto a porous solid since this helps uniformly distribute the coupling agent in the plastics material, master batch or as a coating layer for the filler. Examples of porous solids are blown powders such as calcium and aluminium silicates, diatomaceous earth and bentonite clay. The coupling agent may be mixed with the porous solid itself or it may be added to the porous solid in an organic liquid, water or in the form of an emulsion. In one embodiment, the amount of coupling agent is 20 to 80% based on the weight of the porous solid. The porous solid containing the coupling agent may be added to the plastics material or filler in the same manner as the coupling agent. The composition comprising coupling agent and porous solid may also contain other adjuncts which are commonly contained in the final composite.

The following examples provide illustrations of the invention. These examples are non exhaustive and are not intended to limit the scope of the invention.

EXAMPLES

Preparative Example 1 (PREP1)

Hexadecenylsuccinic anhydride (50 parts 155 mmols) is stirred with 2-hydroxyethylacrylate (17.98 parts, 155 mmols) and 2,6-di-t-butyl-4-methylphenol (0.2 parts) at 100° C. for 8 hours in an air atmosphere. An amber liquid is obtained (57 parts). The IR spectrum of the product indicates the disappearance of the anhydride carbonyl peak. NMR analysis indicates the presence of olefinic protons from an acrylate group. This is coupling agent 1.

Preparative Example 2 (PREP2)

A mixture of octadecenyl succinic anhydride and hexadecenyl succinic anhydride (50 parts, 145 mmols) (50:50 mole percent of octadecenyl succinic anhydride and hexadecenyl succinic anhydride, respectively) is stirred with 2-hydroxyethylacrylate (16.79 parts, 145 mmols) and 2,6-di-t-butyl-4-methylphenol (0.1 parts) at 100° C. for 18 hours in an air atmosphere. An amber liquid is obtained (55 parts). The IR spectrum of the product indicates the disappearance of the anhydride carbonyl peak. NMR analysis indicates the presence of olefinic protons from an acrylate group. This is coupling agent 2.

Preparative Example 3 (PREP3)

Dodecenylsuccinic anhydride (51.5 parts, 193 mmols) was stirred with 2-hydroxyethylacrylate (21.8 parts, 188 mmols) and 2,6-di-t-butyl-4-methylphenol (0.1 parts) at 100° C. for 24 hours in an air atmosphere. An amber liquid is obtained (70 parts). The IR spectrum of the product indicates the disappearance of the anhydride carbonyl peak. NMR analysis indicates the presence of olefinic protons from an acrylate group. This is coupling agent 3.

Preparative Example 4 (PREP4)

Polyisobutenyl succinic anhydride (derived from a polyisobutylene with a number average molecular weight of 550) (50 parts, 92 mmols) is stirred with 2-hydroxyethylacrylate (10.66 parts, 92 mmols) and 2,6-di-t-butyl-4-methylphenol (0.1 parts) at 100° C. for 18 hours in an air atmosphere. An amber liquid is obtained (60 parts). The IR spectrum of the product indicates the disappearance of the anhydride carbonyl peak. NMR analysis indicates the presence of olefinic protons from an acrylate group. This is coupling agent 4.

Preparative Example 5 (PREP5)

Polyisobutenyl succinic anhydride (derived from a polyisobutylene with a number average molecular weight of 750) (50 parts, 70 mmols) is stirred with 2-hydroxyethylacrylate (8.14 parts, 70 mmols) and 2,6-di-t-butyl-4-methylphenol (0.1 parts) at 100° C. for 18 hours in an air atmosphere. An amber liquid is obtained (60 parts). The IR spectrum of the product indicates the disappearance of the anhydride carbonyl peak. NMR analysis indicates the presence of olefinic protons from an acrylate group. This is coupling agent 5.

Preparative Example 6 (PREP6)

Styrene maleic anhydride copolymer (from Aldrich) (25 parts, 13.2 mmols) is stirred with 2-hydroxyethylacrylate (6.88 parts, 59.2 mmols) and 2,6-di-t-butyl-4-methylphenol (0.1 parts) in ethyl acetate (200 ml) at 150° C. for 6 hours in an air atmosphere. The IR spectrum of the product indicates the disappearance of the anhydride carbonyl peak. NMR analysis indicates the presence of olefinic protons from an acrylate group. The solvent is removed at 100° C. and a white solid is obtained (30 parts) upon cooling. This is coupling agent 6.

Preparative Example 7 (PREP7)

Styrene maleic anhydride copolymer (from Aldrich) (25 parts, 13.2 mmols) is stirred with 2-hydroxyethylacrylate (5.21 parts, 44.9 mmols) and 2,6-di-t-butyl-4-methylphenol (0.1 parts) in ethyl acetate (200 ml) at 150° C. for 6 hours in an air atmosphere. The IR spectrum of the product indicates the disappearance of a portion of the anhydride carbonyl peak. NMR analysis indicates the presence of olefinic protons from an acrylate group. The solvent is removed at 100° C. and a white solid was obtained (29 parts) upon cooling. This is coupling agent 7.

Preparative Example 8 (PREP8)

Styrene maleic anhydride copolymer (from Aldrich) (25 parts, 13.2 mmols) is stirred with 2-hydroxyethylacrylate (3.44 parts, 29.6 mmols) and 2,6-di-t-butyl-4-methylphenol (0.1 parts) in ethyl acetate (200 ml) at 150° C. for 6 hours in an air atmosphere. The IR spectrum of the product indicates the disappearance of a portion of the anhydride carbonyl peak. NMR analysis indicates the presence of olefinic protons from an acrylate group. The solvent is removed at 100° C. and a white solid is obtained (27 parts) upon cooling. This is coupling agent 8.

Preparative Example 9 (PREP9)

Styrene maleic anhydride copolymer (from Aldrich) (25 parts, 13.2 mmols) is stirred with 2-hydroxyethylacrylate (1.75 parts, 15 mmols) and 2,6-di-t-butyl-4-methylphenol (0.1 parts) in ethyl acetate (200 ml) at 150° C. for 6 hours in an air atmosphere. The IR spectrum of the product indicates the disappearance of a portion of the anhydride carbonyl peak. NMR analysis indicates the presence of olefinic protons from an acrylate group. The solvent is removed at 100° C. and a white solid is obtained (25 parts) upon cooling. This is coupling agent 9.

Preparative Example 10 (PREP10)

The coupling agent prepared in Example 2 (5 parts) is added to silica (5 parts, ex Ineos silicas) and the mixture is blended together in a high speed grinder until a fine white powder is produced. This is coupling agent 10.

Preparative Example 11 (PREP11)

The coupling agent prepared in Example 4 (5 parts) is added to silica (5 parts, ex Ineos silicas) and the mixture is blended together in a high speed grinder until a fine white powder is produced. This is coupling agent 11.

Plastic Compositions 1 and 2

A series of plastic compositions are prepared by blending 50% Fibretron® 40 wood fibre with 1 wt. % (based on the weight of wood fibre) of a coupling agent (coupling agent 2 and 4, respectively).

Plastic Compositions 3 and 4

A series of plastic compositions are prepared by blending 50% Fibretron® 40 wood fibre with 2 wt. % (based on the weight of wood fibre) of a coupling agent (coupling agent 10 and 11, respectively).

The coupling agent of plastic compositions 1 to 4 is reacted with peroxide (Perkadox® 1440B, commercially available from Akzo Nobel).

The plastic compositions are prepared in a Haake® Polydrive at 150° C. for 10 minutes at 60 rpm. The wood is not pre-dried. The additives are premixed in a blender before stirring into HDPE (high density polyethylene) and adding to the Haake® Polydrive. The samples are then compression molded at 160° C. into sheets approximately 2 mm thick by the following procedure. The procedure involves preheating mold plates for 2 minutes and preheating plates with sample for 1 minute, before molding both plates for 2 minutes. The mold is then allowed to cool for 4 minutes. The molds are then cut into sheets using a band saw. The sheets 14 test bars (11 mm width) and the long edges polished without the use of water before testing. The plastic compositions prepared are summarised in Table 1.

TABLE 1

| | Composition (parts by weight) | | | |
|---|---|---|---|---|
| Plastic Composition | HDPE | Wood | Coupling Agent | Peroxide |
| Control (No Coupling Modifier) | 20 | 20 | 0 | 0 |
| 1 | 20 | 20 | 0.2 | 0.0125 |
| 2 | 20 | 20 | 0.2 | 0.0125 |
| 3 | 20 | 20 | 0.4 | 0.0125 |
| 4 | 20 | 20 | 0.4 | 0.0125 |

Plastic Evaluation

The plastic composition sheets are left for 2 days after polishing at room temperature prior to testing.

The flexural and Charpy impact (un-notched) properties of the plastic compositions are determined using the Hounsfield® HTE10 and Zwick(r) 5102 respectively (properties determined are based on 5 specimens). The samples are weighed prior to testing. Flexural testing is conducted using a span of 40 mm and test speed of 5 mm/min. The flexural strength and modulus are determined for each composition. Impact testing is conducted also using a span of 40 mm and the kinetic energy loss is determined before testing. A 1 J striker is used and the results expressed in Joules/unit fracture area (kJ/m2). The results obtained are presented in Table 2.

TABLE 2

| Plastic Composition | Flex. Str. MPa | Flex. Mod. MPa | Unnotched Impact kJ/m$^2$ |
|---|---|---|---|
| Control (No Coupling Modifier) | 29.0 | 1950 | 4.51 |
| 1 | 34.0 | 2789 | 5.15 |
| 2 | 33.6 | 2492 | 4.42 |
| 3 | 37.2 | 2676 | 4.68 |
| 4 | 35.4 | 2772 | 5.01 |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a plastic material and a compound represented by Formulae (1a) or (1b); and salts thereof:

$$R^1-(Y)_p \quad \text{Formula (1a)}$$

or $$R^2-[(R^1)_u-(Y)_v]_t-R^2 \quad \text{Formula (1b)}$$

wherein repeat unit of $[(R^1)_u-(Y)_v]_t$ represent a random copolymer, or an alternating copolymer an interpolymer;

$R^1$ is a lipophilic group containing 6 or more carbon atoms;

$R^2$ is a polymerisation terminating group;

p varies from 1 to 500;

t is the number of repeat units, in the range of 2 to 10,000;

u varies from 1 to 500;

v varies from 1 to 500;

Y comprises 20% to 100% of Y groups represented by Formula (2), and 0% to 80% of Y groups are represented by the Formulae selected from (3) to (7) wherein each of Formulae selected from (3) to (7) can be present from 0% to 20%:

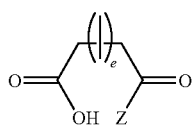
Formula (2)

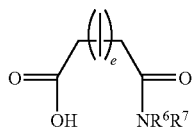
Formula (3)

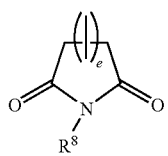
Formula (4)

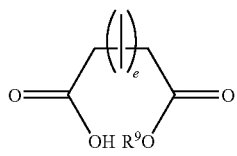
Formula (5)

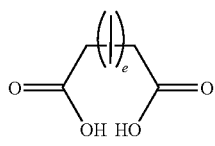
(Formula (6)

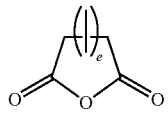
Formula (7)

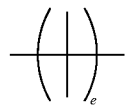

wherein e is 1 or 2 and in the structures of Formulas (2) through (7) represents that a bond at either adjacent methylene group (when e is 1) or bonds at both the methylene group on the left and the methylene group on the right (when e is 2) exist;

Z is —[OACO]$_m$—[OCHR$^3$CR$^4$H]$_n$—R$^5$, or —[OACO]$_m$—[O—(CH$_2$)$_4$]$_n$—R$^5$;

A is C$_{1-20}$ alkylene, C$_{2-20}$ alkenylene group, or mixtures thereof;

m varies from 0 to 50;

n varies from 1 to 50;

R$^3$ and R$^4$ are independently H or C$_1$-C$_2$ alkyl, with the proviso that at least one of R$^3$ and R$^4$ is H;

R$^5$ is an ethylenically unsaturated group; and

R$^6$, R$^7$, R$^8$ and R$^9$ are independently hydrocarbyl groups.

2. The composition of claim 1, comprising a compound represented by Formulae (1a), wherein p is 2 to 500, and the compound of Formula (1a) has a weight average molecular weight of the compound of Formula (1 a) of 500 to 1,000,000.

3. The composition of claim 1, comprising a compound represented by Formulae (1a),wherein R$^1$ is polyolefin.

4. The composition of claim 3, wherein the polyolefin is selected from the group consisting of polyisobutylene, polybutadiene, polypropylene, polyethylene, ethylene vinyl acetate, poly(styrene-butadiene), ethylene vinyl acetate, ethylene-propylene copolymers, ethylene-butadiene copolymers, propylene-butadiene copolymers, and mixtures thereof.

5. The composition of claim 1, comprising a compound represented by Formulae (1a),wherein p=1, and wherein the compound of Formula (1a) has a weight average molecular weight of 200 to 10,000.

6. The composition of claim 5, wherein R$^1$ is a polyisobutentyl group.

7. The composition of claim 6, wherein the polyisobutenyl group has a number average molecular weight of 350-750, or 950-1000, or 2200-2300.

8. The composition of claim 1, comprising a compound represented by Formulae (1a), wherein R$^1$—Y in Formulae (1a) is derived from a polyisobutenyl succinic acid or anhydride.

9. The composition of claim 1, wherein R$^5$ is derived from an acrylic acid, a methacrylic acid, or mixtures thereof.

10. The composition of claim 1, wherein Z is derived from polyethylene glycol acrylate, polypropylene glycol acrylate, 2-hydroxyethylacrylate, 2-hydroxypropylacrylate, 2-hydroxybutylacrylate, 2-hydroxypentylacrylate, 2-hydroxyhexylacrylate, 2-hydroxy-2-methylpropylacrylate, 2-hydroxyethyl methacrylate, 2-hydroxypropyl methacrylate, 2-hydroxybutyl methacrylate, 2-hydroxypentyl methacrylate, 2-hydroxyhexyl methacrylate, 2-hydroxy-2-methylpropyl methacrylate, polyethylene glycol methacrylate, polypropylene glycol methacrylate, or mixtures thereof.

11. The composition of claim 1, comprising a compound represented by Formulae (1b),wherein the compound of Formula (1b) is an alternating copolymer or an interpolymer and R$^5$ is derived from an acrylic acid, a methacrylic acid, or mixtures thereof.

12. The composition of claim 11, wherein the alternating copolymer or an interpolymer is selected from the group consisting of α-olefin-maleic anhydride copolymer, styrene-maleic anhydride copolymers, and mixtures thereof 13. The composition of claim 1, wherein the plastic material comprises one or more plastic selected from the group comprising polyolefins, polyvinyl chloride, polyvinylidene chloride, polystyrene, poly methyl(meth)acrylates; polyamides; polyacetals, linear polyesters, polyurethanes, or ABS polymers.

14. The composition of claim 5, wherein the plastic material comprises one or more plastic selected from the group comprising polyolefins, polyvinyl chloride, polyvinylidene chloride, polystyrene, poly methyl(meth)acrylates; polyamides; polyacetals, linear polyesters, polyurethanes, or ABS polymers.

15. The composition of claim 10, wherein the plastic material comprises one or more plastic selected from the group comprising polyolefins, polyvinyl chloride, polyvinylidene chloride, polystyrene, poly methyl(meth)acrylates; polyamides; polyacetals, linear polyesters, polyurethanes, or ABS polymers.

16. The composition of claim 11, wherein the plastic material comprises one or more plastic selected from the group comprising polyolefins, polyvinyl chloride, polyvinylidene chloride, polystyrene, poly methyl(meth)acrylates; polyamides; polyacetals, linear polyesters, polyurethanes, or ABS polymers.

* * * * *